US012728553B2

(12) United States Patent
Kopelas et al.

(10) Patent No.: US 12,728,553 B2
(45) Date of Patent: Sep. 8, 2026

(54) ADAPTER FOR RAZOR SYSTEM

(71) Applicant: BIC Violex Single Member S.A., Anoixi (GR)

(72) Inventors: Panagiotis Kopelas, Anoixi (GR); Ioanna Preza, Anoixi (GR); Emmanouil Gkithonas, Anoixi (GR); Polykarpos Psaropoulos, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 294 days.

(21) Appl. No.: 18/006,399

(22) PCT Filed: Jul. 14, 2021

(86) PCT No.: PCT/EP2021/069566
§ 371 (c)(1),
(2) Date: Jan. 23, 2023

(87) PCT Pub. No.: WO2022/023036
PCT Pub. Date: Feb. 3, 2022

(65) Prior Publication Data

US 2023/0294316 A1 Sep. 21, 2023

(30) Foreign Application Priority Data

Jul. 27, 2020 (EP) .................................... 20187986

(51) Int. Cl.
*B26B 21/52* (2006.01)
*B26B 21/22* (2006.01)
*B26B 21/40* (2006.01)

(52) U.S. Cl.
CPC .......... *B26B 21/521* (2013.01); *B26B 21/225* (2013.01); *B26B 21/4012* (2013.01)

(58) Field of Classification Search
CPC ..... B26B 21/225; B26B 21/521; B26B 21/40; B26B 21/4068; B26B 21/4075;
(Continued)

(56) References Cited

U.S. PATENT DOCUMENTS 4,413,411 A * 11/1983 Trotta .................. B26B 21/521 30/64
4,488,357 A * 12/1984 Jacobson ............. B26B 21/227 30/527
(Continued)

FOREIGN PATENT DOCUMENTS

CN 1447736 A 10/2003
CN 104870149 A 8/2015
(Continued)

OTHER PUBLICATIONS

International Search Report and Written Opinion issued in International Application No. PCT/EP2021/069566, filed on Sep. 10, 2021 (11 pages).

*Primary Examiner* — Boyer D Ashley
*Assistant Examiner* — Haleigh N Watson
(74) *Attorney, Agent, or Firm* — Bookoff McAndrews, PLLC

(57) ABSTRACT

A razor head and an adapter. The adapter is designed to be connected to the razor head and is designed to be connected to a handle, wherein the razor head can be rotated with respect to the adapter around a razor head axis. According to the present disclosure, a razor head biasing member is at least partially arranged within the adapter. With that, the manufacturing and mounting procedure is facilitated. The razor head biasing member comprises a compression spring element and a pusher element for pushing the razor head into a rest position.

19 Claims, 5 Drawing Sheets

(58) Field of Classification Search

CPC ......... B26B 21/52; B26B 21/00; B26B 21/14; B26B 21/16; B26B 21/22; B26B 21/222; B26B 21/227; B26B 21/4012; B25B 15/02; B25G 1/046; B25G 3/12; B29C 66/54

USPC ........................................ 30/47–51, 526–536

See application file for complete search history.

(56) References Cited

U.S. PATENT DOCUMENTS

| | | | | |
|---|---|---|---|---|
| 5,016,352 | A * | 5/1991 | Metcalf | B26B 21/528 30/47 |
| 5,272,788 | A * | 12/1993 | Gilstrap | B25G 3/30 403/22 |
| 5,299,354 | A * | 4/1994 | Metcalf | B26B 21/38 30/44 |
| 5,787,586 | A * | 8/1998 | Apprille, Jr. | B26B 21/225 30/47 |
| 6,421,925 | B1 * | 7/2002 | Wonderley | B26B 21/4062 30/532 |
| 8,033,023 | B2 | 10/2011 | Johnson et al. | |
| 8,793,880 | B2 | 8/2014 | Taub et al. | |
| 10,131,063 | B2 | 11/2018 | Metcalf et al. | |
| 2007/0050995 | A1 * | 3/2007 | Schnak | B26B 21/526 30/526 |
| 2007/0214662 | A1 * | 9/2007 | Efthimiadis | B26B 21/38 30/527 |
| 2015/0314466 | A1 * | 11/2015 | Papadopoulos-Papageorgi | B26B 21/521 30/526 |
| 2017/0087733 | A1 * | 3/2017 | Metcalf | B26B 21/52 |
| 2017/0341248 | A1 * | 11/2017 | Lee | B26B 21/521 |
| 2017/0341249 | A1 * | 11/2017 | Lee | B26B 21/40 |
| 2020/0070375 | A1 * | 3/2020 | Hurtado | B25G 3/38 |
| 2021/0053241 | A1 * | 2/2021 | Parmele | B26B 21/4062 |

FOREIGN PATENT DOCUMENTS

| | | | | |
|---|---|---|---|---|
| CN | 110248779 | A | 9/2019 | |
| EP | 2387489 | B1 * | 5/2014 | B26B 21/521 |
| EP | 2879845 | B1 | 10/2018 | |
| EP | 3398738 | A1 * | 11/2018 | B26B 21/521 |
| GB | 2116470 | A * | 9/1983 | B26B 21/225 |
| KR | 20030020893 | A | 3/2003 | |
| WO | 9836878 | A3 | 10/1998 | |
| WO | 2014139655 | A2 | 9/2014 | |

* cited by examiner

ADAPTER FOR RAZOR SYSTEM

CROSS-REFERENCE TO RELATED APPLICATION(S)

This patent application is a continuation of and claims the benefit of priority to International Application No. PCT/EP2021069566, filed on Jul. 14, 2021, now published as WO 2022/023036 A1, which claims benefit from European patent application EP20187986.3 filed on Jul. 27, 2020, its content being incorporated herein by reference.

TECHNICAL FIELD

The present disclosure relates to the field of razors, in particular to razors for wet shaving.

TECHNICAL BACKGROUND

Razors for wet shaving having a handle, a razor head and an adapter for connecting the razor head to the handle are known in the art, for example from EP 2 879 845 B1.

The object of the present disclosure is to provide razor head and an adapter ensuring a safe connection between the razor head and a handle, wherein the manufacturing and mounting is facilitated. It is another object of the present disclosure to achieve improved pivoting properties of the razor head relative to the handle.

SUMMARY

The present disclosure relates to a razor head and an adapter as defined in claim 1. The dependent claims depict embodiments of the present disclosure.

The adapter is designed to be connected to the razor head and is designed to be connected to a handle, wherein the razor head can be rotated with respect to the adapter around a razor head axis. According to the present disclosure, a razor head biasing member is at least partially arranged within the adapter. With that, the manufacturing and mounting procedure is facilitated.

The razor head biasing member may comprise a compression spring element and a pusher element for pushing the razor head into a rest position. The compression spring may be fully contained within the adapter, whereas the pusher element may only be partially contained within the adapter. The rest position of the razor head can be defined as being a maximum rotational position of the razor head with respect to the adapter. The portion of the pusher element which protrudes from the adapter may engage a portion of the razor head, when the razor head is mounted on the adapter. The razor head may be rotatable around the razor head axis which is perpendicular or substantially perpendicular to the centroidal axis of the handle extending along the handle by at least up to 20 degrees, when the handle is held stationary, in particular from 0 degrees up to 40 degrees (wherein 0 degrees corresponds to the rest position of the razor head, and 40 degrees corresponds to the fully pivoted position of the razor head). The compression spring of the razor head biasing member may be compressed when the razor head is rotated away from the rest position, in particular when a user moves the razor head along a curved surface of the skin.

The adapter may be adapted to extend from a handle end to a head end, wherein the adapter may comprise an opening extending from the head end to an internal portion of the adapter, and wherein the razor head biasing member may be mounted within that opening of the adapter. This facilitates the mounting of the razor head biasing member to the adapter. In addition, the main components of the razor head biasing member, in particular the spring element, remains in a clean state during use and is less affected from shaving foam which might negatively influence the functioning of the spring element.

The adapter may also comprise at least one aperture which extends from the handle end to an internal portion of the adapter. The aperture of the adapter may have one or more protrusions on the side of the adapter which is designed to be connected to the razor head, wherein the pusher element may have one or more stop elements for engaging the one or more protrusions so that the pusher element cannot extend beyond a maximum extension out of the adapter. This feature also facilitates the mounting of the razor head biasing member within the adapter.

According to another aspect of the present disclosure, the pusher element and the compression spring may be made of a single piece, in particular by injection moulding. This facilitates the manufacturing of the razor head biasing member, because it can be mounted within the adapter as a single piece. The compression spring may have an undulating shape comprising one or more U-shaped structures, wherein the undulating shape may extend within one plane. The adapter may have two planar surfaces neighboring the one or more U-shaped structures on both sides in order to provide a guide structure within the adapter for a controlled compression of the compression spring.

The razor head biasing member may have, in an unmounted and unbiased situation, a length in the range of 10 mm to 20 mm, a width in the range of 2 mm to 12 mm, and a height in the range of 0.8 mm to 3 mm.

The razor head may comprise a housing which is designed to be connected to the adapter. It should be understood that the razor head housing may comprise one or more housing parts, in particular a front housing part and a rear housing part, wherein at least one razor blade (in particular three, four or five razor blades) is contained within the housing.

According to another aspect of the present disclosure, the adapter may comprise one or more elements having the shape of an arc. The head end of the adapter may comprise a pair of arms, each arm having an element having the shape of an arc. The razor head housing or a part of the razor head housing may also have one or more first elements having the shape of an arc which are designed to engage the one or more arc elements of the adapter. In particular, the one or more first arc elements of the razor head may have one or more convex surfaces for engaging and/or mating one or more concave surfaces of the one or more arc elements of the adapter. The arc elements of the adapter and of the housing cooperate with each other to provide a well-defined rotation of the razor head relative to the adapter, which also ensures a better functionality of the razor head biasing member.

The razor head housing or a part of the razor head housing may also have one or more second elements having the shape of an arc which are designed to engage the one or more arc elements of the adapter. The one or more second arc elements of the razor head may have one or more concave surfaces for engaging and/or mating one or more convex surfaces of the one or more arc elements of the adapter. With that, it is possible that the one or more arc elements of the adapter are held between the one or more first arc elements of the razor head and the one or more second arc elements of the razor head.

The one or more concave surfaces of the one or more adapter arc elements and the one or more convex surfaces of the one or more first arc elements of the razor head may correspond to partial surfaces of a cylindrical tube having a first radius of curvature. And the one or more convex surfaces of the one or more adapter arc elements and the one or more concave surfaces of the one or more second arc elements of the razor head may correspond to partial surfaces of a cylindrical tube having a second radius of curvature, wherein the first radius of curvature is smaller than the second radius of curvature. In particular, the first radius of curvature may be within range of 2 to 8 mm, more specifically 4 to 6 mm, and wherein the second radius of curvature may be within a range of 5 to 10 mm, more specifically 6.5 to 8 mm.

In addition, the one or more arc elements of the adapter may have one or more protrusions for engaging one or more stop elements of the razor housing. And the one or more arc elements of the adapter may have one or more protrusions on their concave surfaces for engaging one or more stop elements which are arranged neighboring to or integrally formed at the one or more second arc elements of the razor head. The one or more protrusions of the one or more arc elements of the adapter may engage the one or more stop elements of the razor housing when the razor head is in the rest position.

According to the present disclosure, the razor head may be connected to a handle over the adapter. The handle may comprise a tongue or an extension which is suitable to be received within the adapter, wherein the tongue or extension of the handle is adapted to be slidingly received within the aperture of the adapter. In addition, the handle and the adapter may be designed to be connected via a snap-fit connection.

The handle may comprise a ring element configured to be actuated or rotated at least partially around the axis of the handle such that the connection between the handle and the adapter is released. The ring element may be biased in a rest position for keeping the adapter in a locked state with respect to the handle.

The adapter may comprise one or more protrusions on the side of the handle, wherein the one or more protrusions may be arranged within a recessed portion of the adapter. The ring element may comprise one or more engagement elements for engaging the one or more protrusions of the adapter to keep the adapter in a locked state with respect to the handle. The one or more engagement elements may be disengaged from the one or more protrusions of the adapter by actuating or rotating the ring element.

BRIEF DESCRIPTION OF THE DRAWINGS

Additional details and features of the disclosure are described with reference to the following figures in which.

DETAILED DESCRIPTION

Embodiments of the writing instrument according to the disclosure will be described with reference to the figures as follows.

Figure 1:
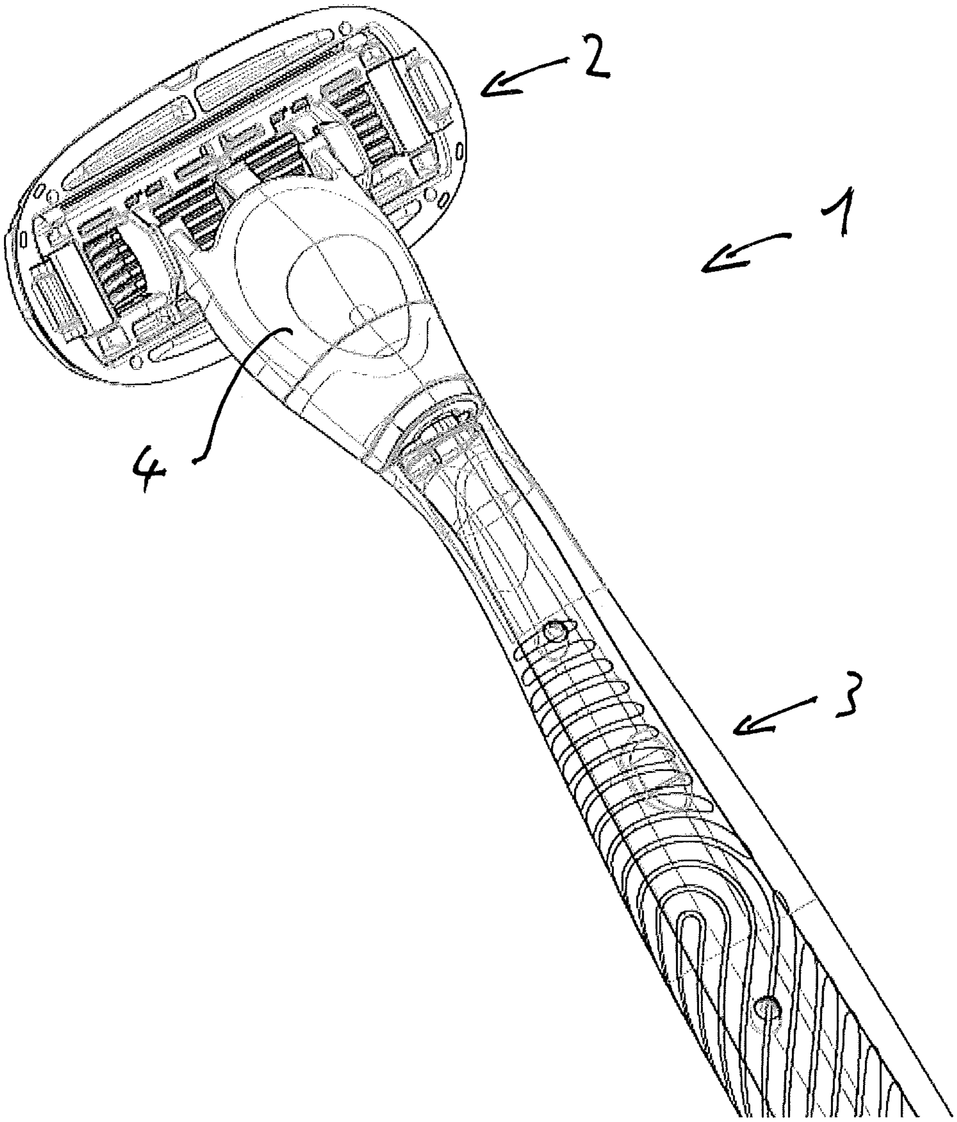
FIG. 1 shows a razor including a razor head, a handle and an adapter for connecting the razor head to the handle according to one embodiment of the present disclosure.
Figure 5:
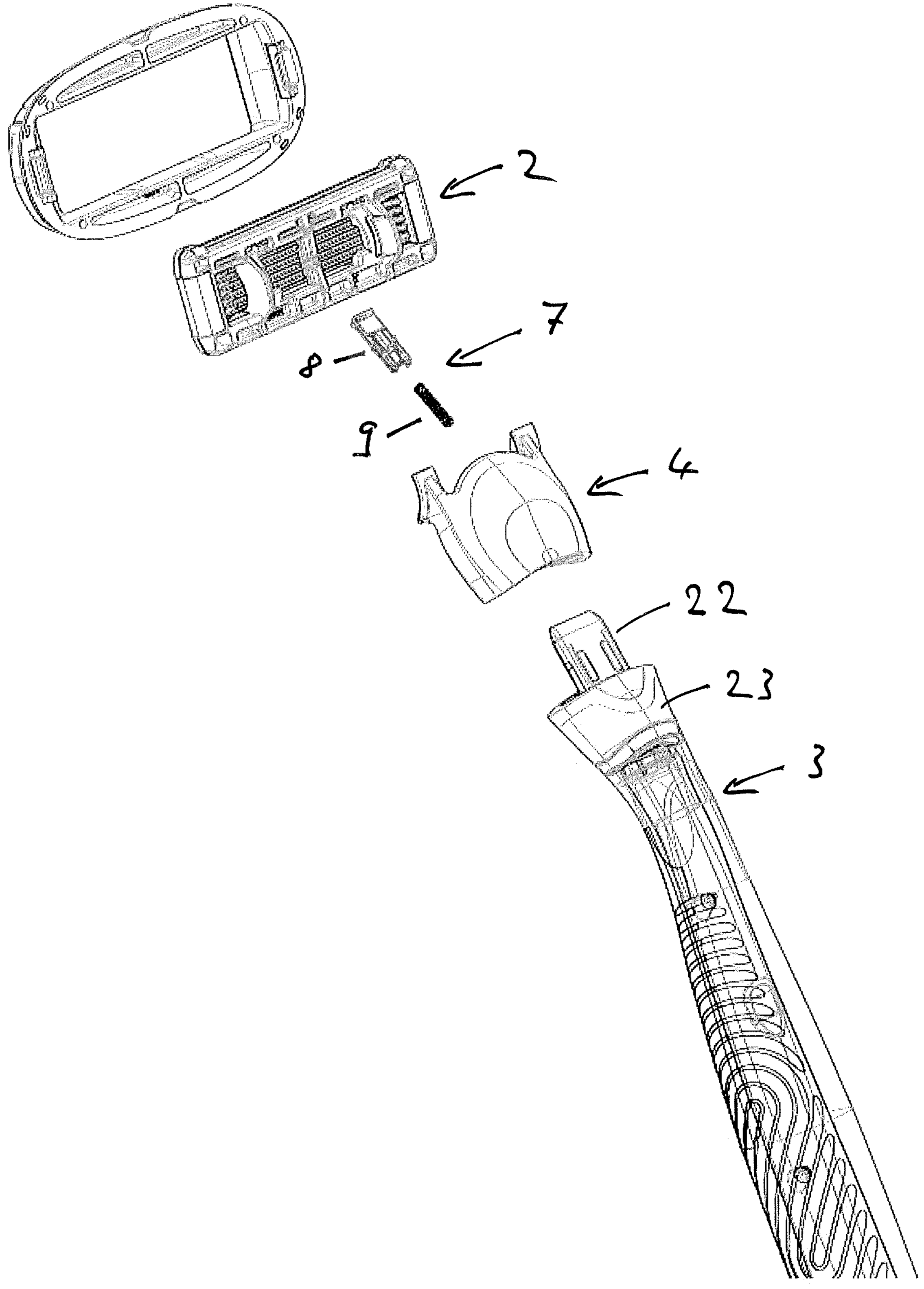
FIG. 5 shows an explosion view of a razor head, a razor head biasing member, an adapter and a handle in demounted state according to one embodiment of the present disclosure.

FIG. 1 shows a razor 1 including a razor head 2, a handle 3 and an adapter 4 for connecting the razor head 2 to the handle 3 according to one embodiment of the present disclosure. As can be seen in FIG. 5, the razor head 2, the adapter 4 and the handle 3 are separate parts, wherein the razor head 2 can be connected to the adapter 4 on one side, and wherein the handle 3 can be connected to the adapter 4 on another opposite side.

Figure 2:
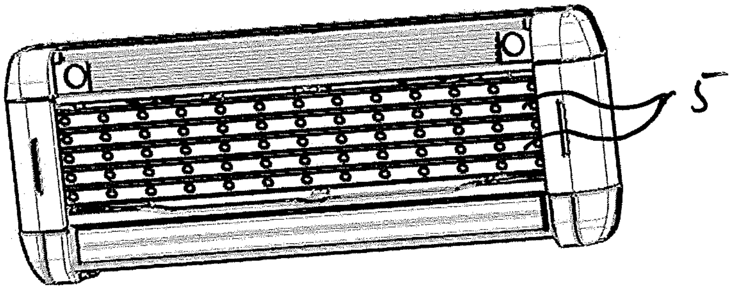
FIG. 2 shows a front view of a razor head according to one embodiment of the present disclosure.

FIG. 2 shows a front view of a razor head according to one embodiment of the present disclosure. The razor head housing may comprise one or more housing parts, in particular a front housing part and a rear housing part, wherein blades 5 (in the shown embodiment five razor blades) are contained within the housing.

Figure 3:
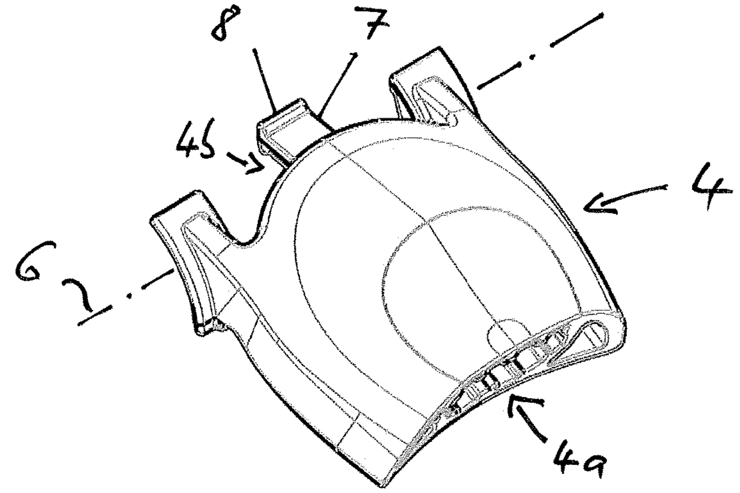
FIG. 3 shows an adapter according to one embodiment of the present disclosure.

FIG. 3 shows an adapter 4 according to one embodiment of the present disclosure. As mentioned, the adapter 4 is designed to be connected to the razor head 2 and is designed to be connected to a handle 3. The razor head can be rotated with respect to the adapter around a (virtual) razor head axis 6 which is defined by the connection elements of the adapter and the razor head which will be explained below in more detail. According to the present disclosure, a razor head biasing member 7 is arranged within the adapter, wherein a pusher element 8 of the biasing member 7 protrudes out of the adapter to engage a surface of the razor head. With that, the manufacturing and mounting procedure is facilitated.

Figure 4A:
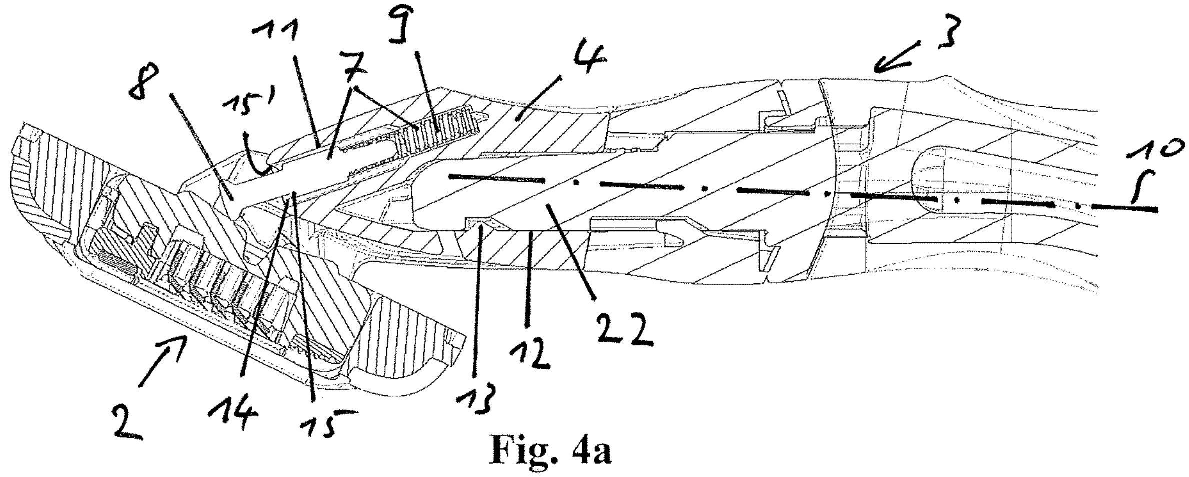
FIG. 4*a* shows a cross-section through a razor head, an adapter and part of a handle according to one embodiment of the present disclosure.

FIG. 4*a* shows a cross-section through a razor head 2, an adapter 4 and part of a handle 3 according to one embodiment of the present disclosure. The razor head biasing member 7 comprises a compression spring element 9 and a pusher element 8 for pushing the razor head 2 into a rest position. The rest position of the razor head 2 can be defined as being a maximum rotational position of the razor head with respect to the adapter 4. The pusher element 8 engages a surface or a portion of the razor head 2, when the razor head 2 is mounted on the adapter 4. The razor head 2 can be rotatable around the razor head axis 6 which is perpendicular or substantially perpendicular to the centroidal axis 10 of the handle 3 extending along the handle by at least up to 20 degrees, when the handle is held stationary, in particular from 0 degrees up to 40 degrees (wherein 0 degrees corresponds to the rest position of the razor head, and 40 degrees corresponds to the fully pivoted position of the razor head). The compression spring 9 of the razor head biasing member is compressed when the razor head 2 is rotated away from the rest position (in FIG. 2 in clockwise direction), in particular when a user moves the razor head along a curved surface of the skin.

The adapter 4 extends from a handle end 4*a* to a head end 4*b*, wherein the adapter 4 comprises an opening 11 extending from the head end 4*b* to an internal portion of the adapter, and wherein the razor head biasing member 7 is mounted within that opening 11 of the adapter 4. This facilitates the mounting of the razor head biasing member 4 to or within the adapter 4. In addition, the main components of the razor head biasing member, in particular the spring element 7, remains in a clean state during use and is less affected from shaving foam which might negatively influence the functioning of the spring element.

Figure 4B:
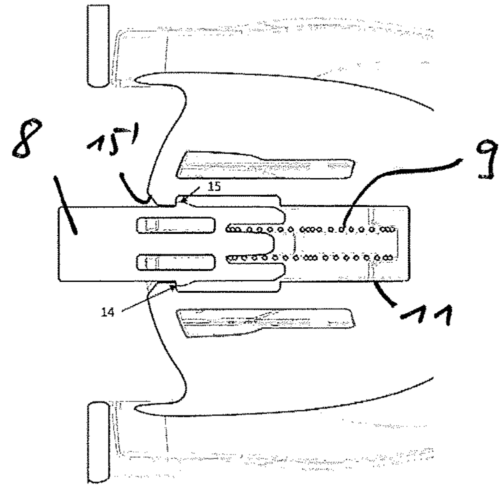
FIG. 4*b* shows a cross-section through an adapter according to one embodiment of the present disclosure.

The opening 11 of the adapter may have one or more protrusions 14 on the side of the adapter which is designed to be connected to the razor head 2, wherein the pusher element 8 has one or more stop elements 15 for engaging the one or more protrusions 14 so that the pusher element cannot extend beyond a maximum extension out of the adapter. This feature also facilitates the mounting of the razor head biasing member within the adapter. As shown in FIG. 4*b*, the protrusions 14 of the adapter and the stop elements 15 may—in addition or alternatively—be arranged on two lateral sides within opening 11. The adapter may have surfaces 15' at one end of the opening 11 which is tilted with respect to the axis of the opening in order to facilitate mounting of the pusher element into the opening. In examples, one tilted surface 15' is provided for each stop element 15 so that their engagement pushed the corresponding protrusion 14 slightly outwardly when the pusher element is inserted into the opening 11.

The adapter may also comprise at least one aperture 12 which extends from the handle end 4*a* to an internal portion of the adapter 4. The aperture 12 of the adapter may have at least one protrusion 13 for engaging the handle.

FIG. 5 shows an explosion view of a razor head 2, a razor head biasing member 7, an adapter 4 and a handle 3 in demounted state for a better understanding of the present disclosure.

Figure 6:
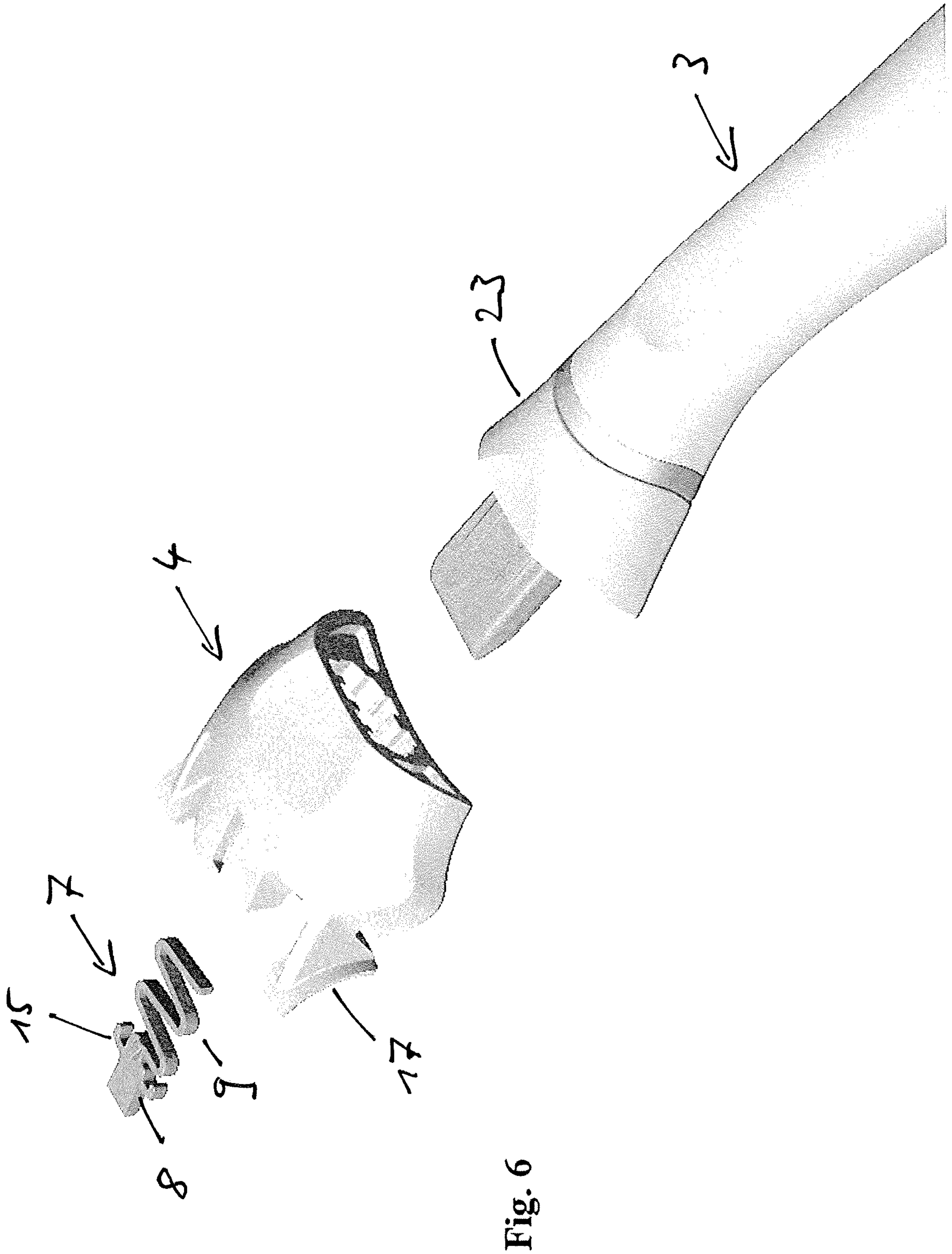
FIG. 6 shows an explosion view of a razor head biasing member, an adapter and a handle in demounted state according to another embodiment of the present disclosure.

FIG. 6 shows an explosion view of a razor head biasing member, an adapter and a handle in demounted state according to another embodiment of the present disclosure. In this embodiment, the pusher element 8 and the compression spring 9 are made of a single piece, in particular by injection moulding using a plastic material. This facilitates the manufacturing of the razor head biasing member 7, because it can be mounted within the adapter as a single piece. As shown, the compression spring 9 has an undulating shape comprising several connected U-shaped structures, wherein, in examples, the undulating shape extends within one plane. The adapter 4 may have two internal planar surfaces neighboring the one or more U-shaped structures on both sides in order to provide a guide structure within the adapter 4 for a controlled compression of the compression spring.

The razor head biasing member 7 may have, in an unmounted and unbiased situation, a length in the range of 10 mm to 20 mm, a width in the range of 2 mm to 12 mm, and a height in the range of 0.8 mm to 3 mm.

Figure 7:
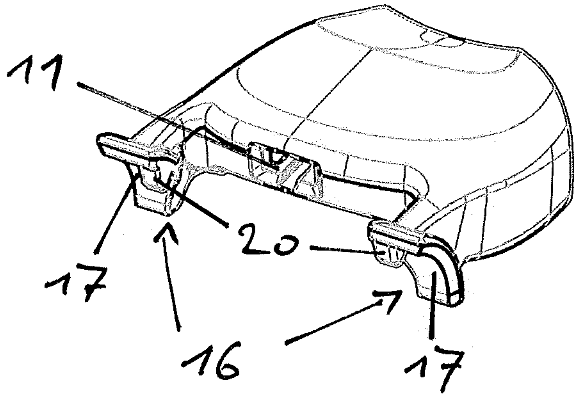
FIG. 7 shows an adapter according to an embodiment of the present disclosure.

According to another aspect of the present disclosure as shown in FIG. 7, the adapter 4 comprises one or more elements 17 having the shape of an arc. The head end 4*b* of the adapter 4 comprises a pair of arms 16, each arm having an element 17 having the shape of an arc. The razor head housing or a part of the razor head housing may also have one or more first elements 18 having the shape of an arc which are designed to engage the one or more arc elements

17 of the adapter. In particular, the one or more first arc elements 18 of the razor head may have one or more convex surfaces for engaging and/or mating one or more concave surfaces of the one or more arc elements 17 of the adapter. The arc elements 17, 18 of the adapter and of the housing cooperate with each other to provide a well-defined rotation of the razor head relative to the adapter around virtual axis 6 (see FIG. 3), which also ensures a better functionality of the razor head biasing member.

Figure 8:
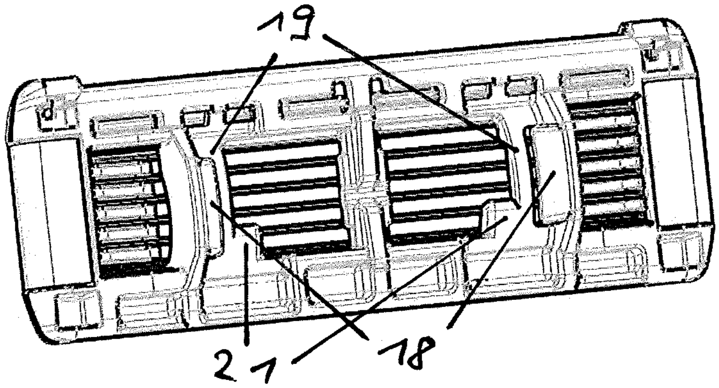
FIG. 8 shows a rear view of a razor head according to an embodiment of the present disclosure.
Figure 9:
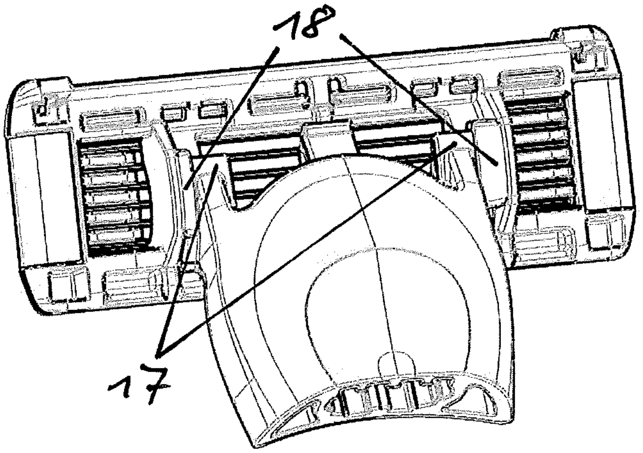
FIG. 9 shows a razor had connected to an adapter according to an embodiment of the present disclosure.

As shown in FIG. 8, the razor head housing or a part of the razor head housing may also have one or more second elements 19 having the shape of an arc which are designed to engage the one or more arc elements 17 of the adapter. The one or more second arc elements 19 of the razor head may have one or more convex surfaces for engaging and/or mating one or more concave surfaces of the one or more arc elements 17 of the adapter (see FIG. 9). With that, it is possible that the one or more arc elements 17 of the adapter are held between the one or more first arc elements 18 of the razor head and the one or more second arc elements 19 of the razor head.

The one or more concave surfaces of the one or more adapter arc elements 17 and the one or more convex surfaces of the one or more first arc elements 18 of the razor head may correspond to partial surfaces of a cylindrical tube having a first radius of curvature. And the one or more concave surfaces of the one or more adapter arc elements 17 and the one or more convex surfaces of the one or more second arc elements 19 of the razor head may correspond to partial surfaces of a cylindrical tube having a second radius of curvature, wherein the first radius of curvature is smaller than the second radius of curvature. In particular, the first radius of curvature is within range of 2 to 8 mm, more specifically 3 to 5 mm, and wherein the second radius of curvature is within a range of 5 to 10 mm, more specifically 4 to 8 mm.

In addition, the one or more arc elements 17 of the adapter may have one or more protrusions 20 for engaging one or more stop elements 21 of the razor housing. In particular, the one or more arc elements 17 of the adapter may have one or more protrusions 20 on their concave surfaces for engaging one or more stop elements 21 which are arranged neighboring to or integrally formed at the one or more second arc elements 19 of the razor head. The one or more protrusions 20 of the one or more arc elements of the adapter may engage the one or more stop elements 21 of the razor housing when the razor head is in the rest position.

Figure 10:
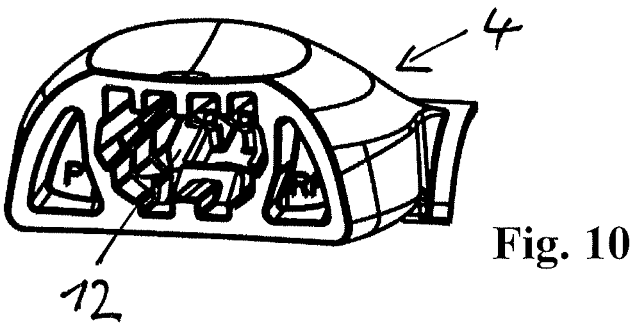
FIG. 10 shows a rear view of an adapter according to an embodiment of the present disclosure.

According to the present disclosure, the razor head 2 may be connected to a handle 3 through the adapter 4. The handle may comprise a tongue or an extension 22 which is suitable to be received within the aperture 12 of the adapter, wherein the tongue or extension 22 of the handle is adapted to be slidingly received within the aperture of the adapter. In addition, the handle and the adapter may be designed to be connected via a snap-fit connection (see protrusion 13 in FIG. 4). A rear view of the adapter 4 showing the aperture 12 can be seen in FIG. 10.

The handle 3 may comprise a ring element 23 which can be actuated or rotated at least partially around the axis of the handle for releasing the connection between the handle 3 and the adapter 4. The ring element 23 may be biased in a rest position for keeping the adapter in a locked state with respect to the handle.

As already mentioned, the adapter 4 may comprise one or more protrusions 13 on the side of the handle, wherein the one or more protrusions 13 may be arranged within a recessed portion of the adapter. The ring element may comprise one or more engagement elements for engaging the one or more protrusions of the adapter to keep the adapter in a locked state with respect to the handle. The one or more engagement elements may be disengaged from the one or more protrusions of the adapter by actuating or rotating the ring element.

Although the present disclosure has been described above and is defined in the attached embodiments, it should be understood that the disclosure may alternatively be defined in accordance with the following embodiments:

1. A razor head (2) and an adapter (4), wherein the adapter (4) is designed to be connected to the razor head (2) and is designed to be connected to a handle (3),
   wherein the razor head (2) can be rotated with respect to the adapter (4), characterized by a razor head biasing member (7) which is at least partially arranged within the adapter (4).
2. The razor head and adapter of embodiment 1, wherein the razor head biasing member (7) comprises a compression spring element (9) and a pusher element (8) for pushing the razor head into a rest position, wherein the compression spring (8) is fully contained within the adapter, and wherein the pusher element (9) is only partially contained within the adapter.
3. The razor head and adapter of embodiment 1 or 2, wherein the rest position of the razor head (2) is defined as a maximum rotational position of the razor head with respect to the adapter (4).
4. The razor head and adapter of one of the preceding embodiments, wherein the razor head (2) is rotatable around a razor head axis (6) which is substantially perpendicular to the centroidal axis (10) of the handle extending along the handle by at least up to 20 degrees, when the handle is held stationary, in particular from 0 degrees up to 40 degrees.
5. The razor head and adapter of one of the preceding embodiments, wherein the compression spring (9) of the razor head biasing member (7) is compressed when the razor head (2) is rotated away from the rest position.
6. The razor head and adapter of one of the preceding embodiments, wherein the adapter (4) is adapted to extend from a handle end (4*a*) to a head end (4*b*), the adapter comprising an opening (11) extending from the head end (4*b*) to an internal portion of the adapter, wherein the razor head biasing member (7) is mounted within that opening (11) of the adapter.
7. The razor head and adapter of one of the preceding embodiments, wherein the adapter comprises an aperture (12) which extends from the handle end (4*a*) to an internal portion of the adapter.
8. The razor head and adapter of one of the preceding embodiments, wherein the pusher element (8) engages the razor head (2), when the razor head is mounted on the adapter.
9. The razor head and adapter of one of the preceding embodiments, wherein the opening (11) of the adapter has one or more protrusions (14) on the side of the adapter which is designed to be connected to the razor head, and wherein the pusher element (8) has one or more stop elements (15) for engaging the one or more protrusions (14) so that the pusher element (8) cannot extend beyond a maximum extension out of the adapter (4).
10. The razor head and adapter of one of the preceding embodiments, wherein the pusher element (8) and the compression spring (9) are made of a single piece, in particular by injection moulding.

11. The razor head and adapter of one of the preceding embodiments, wherein the compression spring (9) has an undulating shape comprising one or more U-shaped structures, wherein the undulating shape extends within one plane.
12. The razor head and adapter of one of the preceding embodiments, wherein the razor head biasing member (7) has, in an unmounted and unbiased situation, a length in the range of 10 mm to 20 mm, a width in the range of 2 mm to 12 mm, and a height in the range of 0.8 mm to 3 mm.
13. The razor head and adapter of one of the preceding embodiments, wherein the adapter comprises one or more elements (17) having the shape of an arc.
14. The razor head and adapter of one of the preceding embodiments, wherein a head end (4*b*) of the adapter comprises a pair of arms (16), each arm having an element (17) having the shape of an arc.
15. The razor head and adapter of one of the preceding embodiments, wherein the razor head (2) comprises a housing which is designed to be connected to the adapter.
16. The razor head and adapter of one of the preceding embodiments, wherein the razor head housing comprises one or more housing parts.
17. The razor head and adapter of one of the preceding embodiments, wherein the razor head housing or a part of the razor head housing has one or more first elements (18) having the shape of an arc which are designed to engage the one or more arc elements (17) of the adapter.
18. The razor head and adapter of one of the preceding embodiments, wherein the one or more first arc elements (18) of the razor head have one or more convex surfaces for engaging and/or mating one or more concave surfaces of the one or more arc elements (17) of the adapter.
19. The razor head and adapter of one of the preceding embodiments, wherein the razor head housing or a part of the razor head housing has one or more second elements (19) having the shape of an arc which are designed to engage the one or more arc elements (17) of the adapter.
20. The razor head and adapter of one of the preceding embodiments, wherein the one or more second arc elements (19) of the razor head have one or more convex surfaces for engaging and/or mating one or more concave surfaces of the one or more arc elements (17) of the adapter.
21. The razor head and adapter of one of the preceding embodiments, wherein the one or more arc elements (17) of the adapter are held between the one or more first arc elements (18) of the razor head and the one or more second arc elements (19) of the razor head.
22. The razor head and adapter of one of the preceding embodiments, wherein the one or more concave surfaces of the one or more adapter arc elements (17) and the one or more convex surfaces of the one or more first arc elements (18) of the razor head correspond to partial surfaces of a cylindrical tube having a first radius of curvature.
23. The razor head and adapter of one of the preceding embodiments, wherein the one or more convex surfaces of the one or more adapter arc elements (17) and the one or more concave surfaces of the one or more second arc elements (18) of the razor head correspond to partial surfaces of a cylindrical tube having a second radius of curvature.

24. The razor head and adapter of one of the preceding embodiments, wherein the first radius of curvature is smaller than the second radius of curvature.

25. The razor head and adapter of one of the preceding embodiments, wherein the first radius of curvature is within range of 2 to 8 mm, more specifically 3 to 5 mm, and wherein the second radius of curvature is within a range of 5 to 10 mm, more specifically 4 to 8 mm.

26. The razor head and adapter of one of the preceding embodiments, wherein the one or more arc elements (17) of the adapter have one or more protrusions (20) for engaging one or more stop elements (21) of the razor housing.

27. The razor head and adapter of one of the preceding embodiments, wherein the one or more arc elements (17) of the adapter have one or more protrusions (20) on their concave surfaces for engaging one or more stop elements (21) which are arranged neighboring to or integrally formed at the one or more second arc elements (19) of the razor head.

28. The razor head and adapter of one of the preceding embodiments, wherein the one or more protrusions (20) of the one or more arc elements (17) of the adapter engage the one or more stop elements (21) of the razor housing when the razor head is in the rest position.

29. The razor head and adapter of one of the preceding embodiments, wherein the razor head comprises one or more razor blades (5), in particular three, four or five razor blades.

30. A razor (1) comprising the razor head (2) and the adapter (4) according to one of the preceding embodiments, further comprising a handle (3) which is designed to be connected to the adapter.

31. The razor according to embodiment 30, wherein the handle comprises a tongue or an extension (22) which is suitable to be received within the adapter (4).

32. The razor according to embodiment 31, wherein the tongue or extension (22) of the handle is adapted to be slidingly received within the aperture (12) of the adapter.

33. The razor according to one of embodiments 30 to 32, wherein the handle and the adapter are designed to be connected via a snap-fit connection.

34. The razor according to one of embodiments 30 to 33, wherein the handle comprises a ring element (23) which can be actuated or rotated at least partially around the axis of the handle for releasing the connection between the handle and the adapter.

35. The razor according to embodiment 34, wherein the ring element (23) is biased in a rest position for keeping the adapter in a locked state with respect to the handle.

36. The razor according to one of embodiments 30 to 35, wherein the adapter comprises one or more protrusions (13) on the side of the handle, wherein the one or more protrusions (13) are arranged within a recessed portion of the adapter.

37. The razor according to one of embodiments 34 to 36, wherein the ring element (23) comprises one or more engagement elements for engaging the one or more protrusions (13) of the adapter to keep the adapter in a locked state with respect to the handle.

38. The razor according to one of embodiments 34 to 37, wherein the one or more engagement elements can be disengaged from the one or more protrusions of the adapter by rotating the ring element (23).

39. The razor according to one of embodiments 30 to 38, wherein the adapter is fixedly or removably attached to the handle.

The invention claimed is:

1. A razor head and an adapter, the adapter having a razor head biasing member at least partially arranged within the adapter, wherein the adapter is designed to be connected to the razor head and is designed to be connected to a handle, wherein the razor head biasing member further comprises a pusher element for pushing the razor head into a rest position within the adapter and a compression spring element, wherein the razor head can be rotated with respect to the adapter, wherein the adapter is adapted to extend from a handle end to a head end, the adapter comprising an opening extending from the head end to an internal portion of the adapter and an aperture which extends from the handle end to the internal portion of the adapter, wherein the aperture is configured to receive an extension of the handle, wherein the compression spring element is at least partially located above the aperture and the extension of the handle, and wherein the razor head biasing member is mounted within the opening of the adapter, wherein the opening of the adapter has one or more protrusions on a side of the adapter which is designed to be connected to the razor head, wherein the pusher element has one or more stop elements for engaging the one or more protrusions so that the pusher element cannot extend beyond a maximum extension out of the adapter, and wherein the adapter has one or more tilted surfaces located and formed at the opening of the adapter and corresponding to the one or more protrusions such that, when the pusher element is inserted into the adapter, the one or more stop elements engage with the one or more tilted surfaces and the one or more tilted surfaces push the one or more protrusions outwardly, facilitating mounting of the razor head biasing member into the opening, wherein the one or more tilted surfaces are tilted with respect to an axis of the opening.

2. The razor head and adapter of claim 1, wherein the compression spring element is fully contained within the adapter, and wherein the pusher element is only partially contained within the adapter.

3. The razor head and adapter of claim 2, wherein the pusher element and the compression spring element are made of a single piece.

4. The razor head and adapter of claim 1, wherein the adapter comprises one or more elements having the shape of an arc.

5. The razor head and adapter of claim 4, wherein a razor head housing or a part of the razor head housing has one or more first elements having the shape of an arc which are designed to engage the one or more arc elements of the adapter.

6. The razor head and adapter of claim 5, wherein the razor head housing or the part of the razor head housing has one or more second elements having the shape of an arc which are designed to engage the one or more arc elements of the adapter.

7. The razor head and adapter of claim 6, wherein the one or more second arc elements of the razor head have one or more convex surfaces for engaging and/or mating one or more concave surfaces of the one or more arc elements of the adapter.

8. The razor head and adapter of claim 7, wherein the one or more arc elements of the adapter are held between the one or more first arc elements of the razor head and the one or more second arc elements of the razor head.

9. The razor head and adapter of claim 8, wherein the one or more concave surfaces of the one or more adapter arc elements and the one or more convex surfaces of the one or more first arc elements of the razor head correspond to partial surfaces of a cylindrical tube having a first radius of curvature.

10. The razor head and adapter of claim 9, wherein the one or more convex surfaces of the one or more adapter arc elements and the one or more concave surfaces of the one or more second arc elements of the razor head correspond to partial surfaces of a cylindrical tube having a second radius of curvature.

11. The razor head and adapter of claim 10, wherein the first radius of curvature is smaller than the second radius of curvature.

12. The razor head and adapter of claim 11, wherein the one or more arc elements of the adapter have one or more protrusions on their concave surfaces for engaging one or more stop elements which are arranged neighboring to or integrally formed at one or more second arc elements of the razor head, and wherein the one or more protrusions of the one or more arc elements of the adapter engage the one or more stop elements of the razor housing when the razor head is in a rest position.

13. A razor comprising the razor head and the adapter according to claim 1, further comprising the handle which is designed to be connected to the adapter, wherein the handle comprises a ring element configured to be actuated or rotated at least partially around an axis of the handle such that the connection between the handle and the adapter is released.

14. The razor head and adapter of claim 1, wherein the razor head biasing member has a length between 10 mm to 20 mm, a width between 2 mm to 12 mm, and a height between 0.3 mm to 3 mm.

15. The razor head and adapter of claim 1, wherein the compression spring element has an undulating shape comprising a line of one or more U-shaped structures such that a first U-shaped structure is connected in series with a second U-shaped structure, and wherein the undulating shape extends within one plane.

16. The razor head and adapter of claim 2, wherein the razor head biasing member, when at least partially arranged within the adapter, is at an acute angle with respect to a centroidal axis, and wherein the compression spring element is at least partially located above the aperture.

17. The razor head and adapter of claim 1, wherein the one or more tilted surfaces and the one or more protrusions are unitarily formed, wherein the one or more tilted surfaces and the one or more protrusions are axially aligned, and wherein the compression spring element is at an acute angle with respect to a centroidal axis.

18. The razor head and an adapter of claim 1, wherein the compression spring element is at least partially located above the extension of the handle and a protrusion for engaging the extension of the handle.

19. The razor head and an adapter of claim 1, wherein the extension of the handle is located between the compression spring element and a protrusion for engaging the extension of the handle.

* * * * *